United States Patent [19]
Iung

[11] 3,885,589
[45] May 27, 1975

[54] COCK AND PRESSURE-REDUCER UNIT FOR LIQUEFIED-GAS RESERVOIRS

[75] Inventor: Jacques Iung, Pontarlier, France

[73] Assignee: Gurtner S.A., France

[22] Filed: May 16, 1973

[21] Appl. No.: 360,918

[30] Foreign Application Priority Data
May 18, 1972 France .................. 72.17880

[52] U.S. Cl. ....... 137/613; 137/505.35; 137/505.41
[51] Int. Cl. .............................................. F16k 21/00
[58] Field of Search . 137/613, 608, 505.29, 505.35, 137/505.41, 505.42, 546, 171, 172; 251/367

[56] References Cited
UNITED STATES PATENTS

| | | | |
|---|---|---|---|
| 2,103,576 | 12/1937 | Dockson | 137/505.41 |
| 2,119,473 | 5/1938 | Smith et al. | 137/613 X |
| 2,307,309 | 1/1943 | Thomas | 137/613 X |
| 2,362,352 | 11/1944 | Buttner | 251/367 X |
| 2,405,998 | 8/1946 | Buttner et al. | 137/608 X |
| 2,854,991 | 10/1958 | Webster | 137/613 X |
| 3,386,458 | 6/1968 | Wasserman et al. | 137/613 X |
| 3,521,669 | 7/1970 | Suchowolec et al. | 137/613 X |
| 3,547,143 | 12/1970 | Mills, Jr. | 137/613 X |
| 3,561,477 | 2/1971 | Pinto | 137/613 X |
| 3,604,445 | 9/1971 | Jordan | 137/613 X |
| 3,693,652 | 9/1972 | Iung | 137/557 |
| 3,795,258 | 3/1974 | Iung | 137/505.35 |

Primary Examiner—Charles J. Myhre
Assistant Examiner—Ira S. Lazarus
Attorney, Agent, or Firm—Steinberg & Blake

[57] ABSTRACT

Cock and pressure-reducer unit for connecting a source of liquefied gas under pressure to a gas distribution network after reducing the pressure of the said gas, the said unit comprising notably a flow-limiting device, a stop cock and a pressure-reducing device, said components being so arranged that the gas proceeding from the reservoir and supplied to the network passes successively through the flow-limiting device, the stop cock and the pressure-reducing device, said flow-limiting device and the said stop cock being mounted on a first body and the pressure-reducing device being mounted on a second body sealingly fitted into said first body.

11 Claims, 8 Drawing Figures

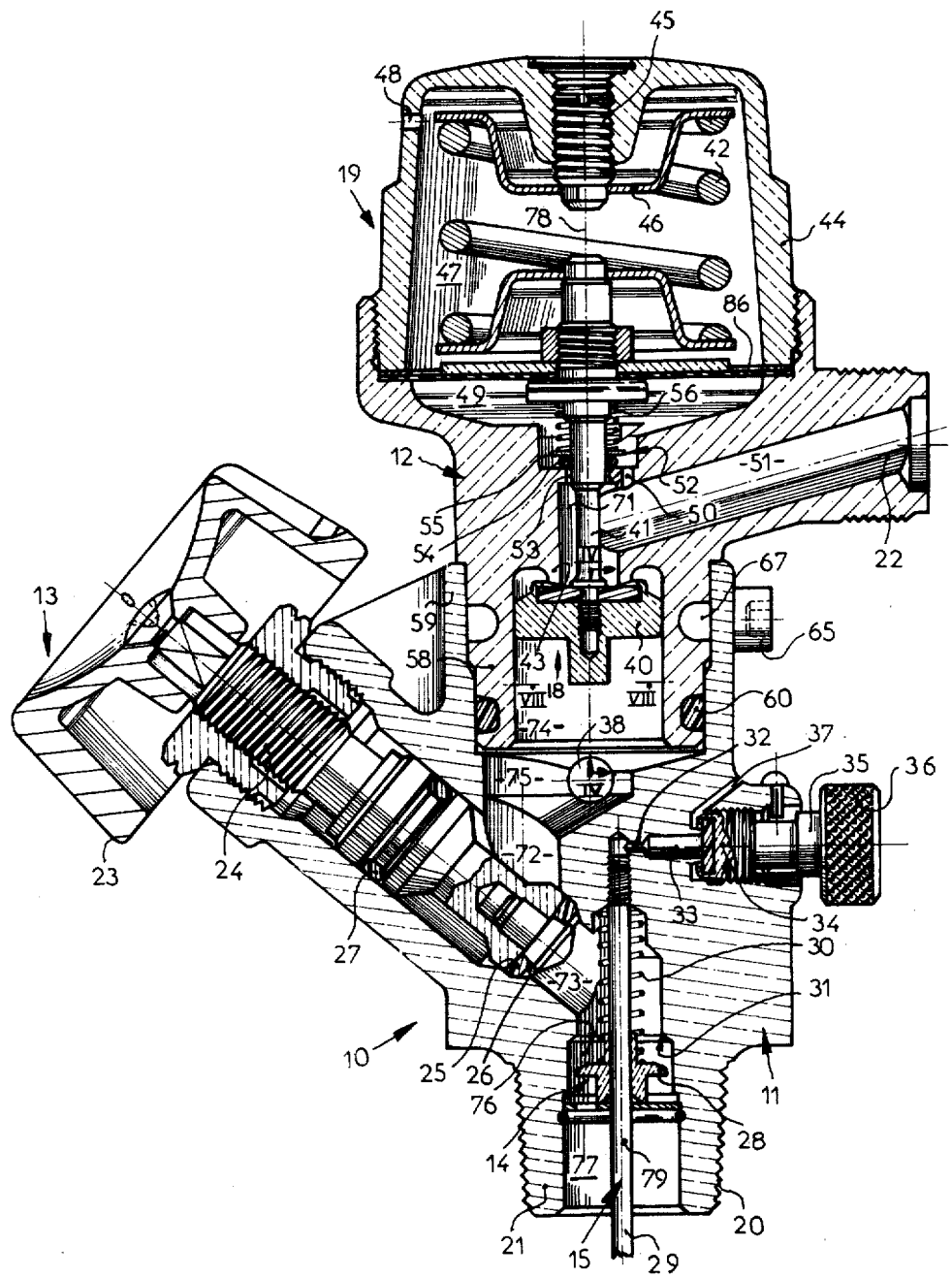

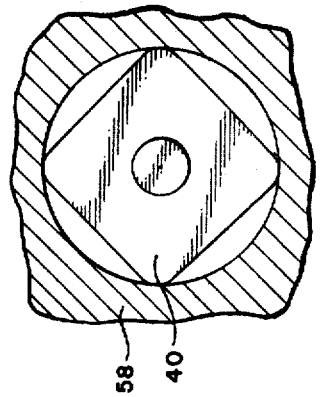
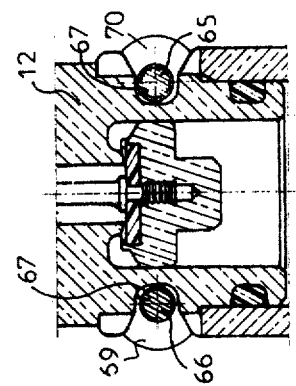
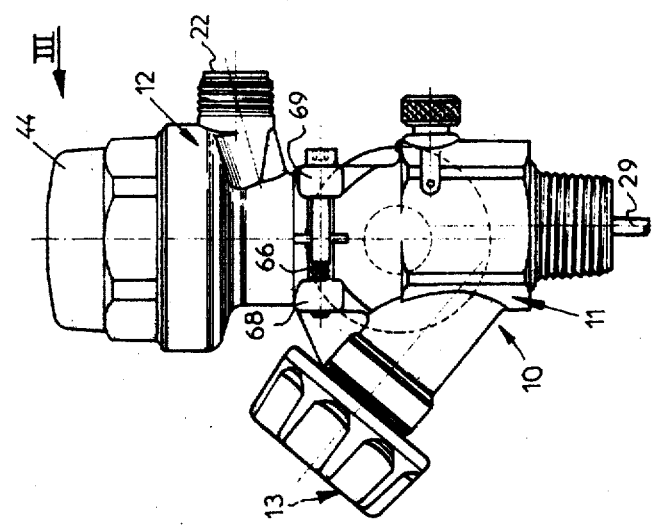
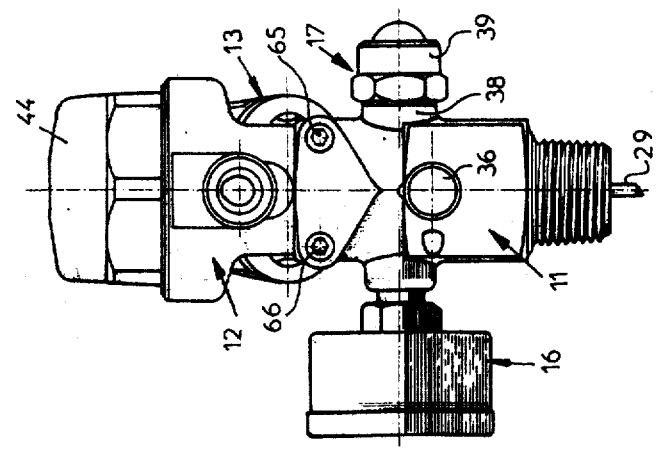

COCK AND PRESSURE-REDUCER UNIT FOR LIQUEFIED-GAS RESERVOIRS

The present invention has essentially for its object an apparatus forming a cock and pressure-reducer unit for connecting a tank or a reservoir containing liquefied gas under pressure to a gas distribution network after reducing the pressure of the gas to its distribution value.

The apparatus according to the invention is intended more particularly for reservoirs containing liquefied petroleum-gas such as, in particular, propane, butane and, more generally, $C_3$ and $C_4$ hydrocarbons, and fulfilling various functions such as, in particular, limiting the flow of gas to be distributed, stopping the distribution, reducing the pressure of the gas at the beginning of the distribution network and permitting in particular the level and pressure in the tank to be checked. The invention applies more particularly to distribution tanks of from several hundred to a few thousand litres.

The cock and pressure-reducer unit according to the invention is of the type comprising a flow-limiting device, a stop cock, a pressure-reducing device controlled by a manometric chamber subjected to the action of the gas pressure at the inlet into the distribution network and a maximum level gauge. It also comprises a pressure control apparatus enabling the gas pressure in the tank to be checked. This apparatus, which forms a unit, is characterized according to the invention, in that its aforesaid components are so arranged with respect to one another that the gas proceeding from the reservoir and delivered to the network passes successively through the flow limiting device, the stop cock and the pressure-reducing device, the said flow limiting device and the said stop cock being mounted on one and the same first body, whereas the pressure-reducing device and its control chamber are mounted on one and the same second body, the said second body being mounted on the said first body by being sealingly fitted into the latter. The apparatus thus forms a unit composed essentially of two parts or bodies which can be assembled to one another in a simple manner. The most vunerable part, or the one whose characteristics may have to be different according to the distribution network and which comprises the controlled pressure-reducing device, can thus be changed as a single part by disassembling the said first and second bodies from one another, the distribution of the gas being stopped by closing the stop cock mounted on the first body.

According to another feature of the invention, a plug is mounted on the cock and pressure-reducer unit to close a connection orifice which opens into the chamber of the cock and pressure-reducer unit downstream of the stop cock and upstream of the pressure-reducing device, so that after removing the said plug the said orifice can be connected to a stand-by gas source such as a gas bottle or cylinder. It is thus possible, if work is to be done on the main tank or if the latter has emptied, to connect a stand-by bottle to the said connection orifice, and then close the stop cock. The distribution network thus continues to be supplied normally by the stand-by bottle without the failure of the tank having any effect upon distribution.

According to still another feature of the invention, when the apparatus is in the assembled state and the medial axes of the said first body and the said second body are substantially vertical, the ducts and the chambers of the cock and pressure-reducer unit through which the gas passes are so formed or arranged as to enable any condensate formed in or liquid entrained into the cock and pressure-reducer unit to flow freely, by gravity, into the chamber or the duct located downstream, so that the said condensates or liquids return automatically into the tank.

The invention will be better understood and other objects, characteristics and advantages thereof will appear as the following description proceeds, with reference to the appended drawings given solely by way of example illustrating one form of embodiment of the invention and wherein:

FIG. 1 is a view in vertical section through the two axes of the two bodies of an apparatus designed according to the invention;

FIG. 2 is an elevational view, to a smaller scale, showing the apparatus in the position illustrated in FIG. 1;

FIG. 3 is an external view of the apparatus according to arrow III of FIG. 2;

FIG. 4 is a sectional broken-away view substantially in the plane IV—IV of FIG. 1;

FIG. 8 is a partly sectional plan view of a valve member as seen from the bottom, FIG. 8 being taken along line VIII—VIII of FIG. 1 in the direction of the arrows.

Figure 5:
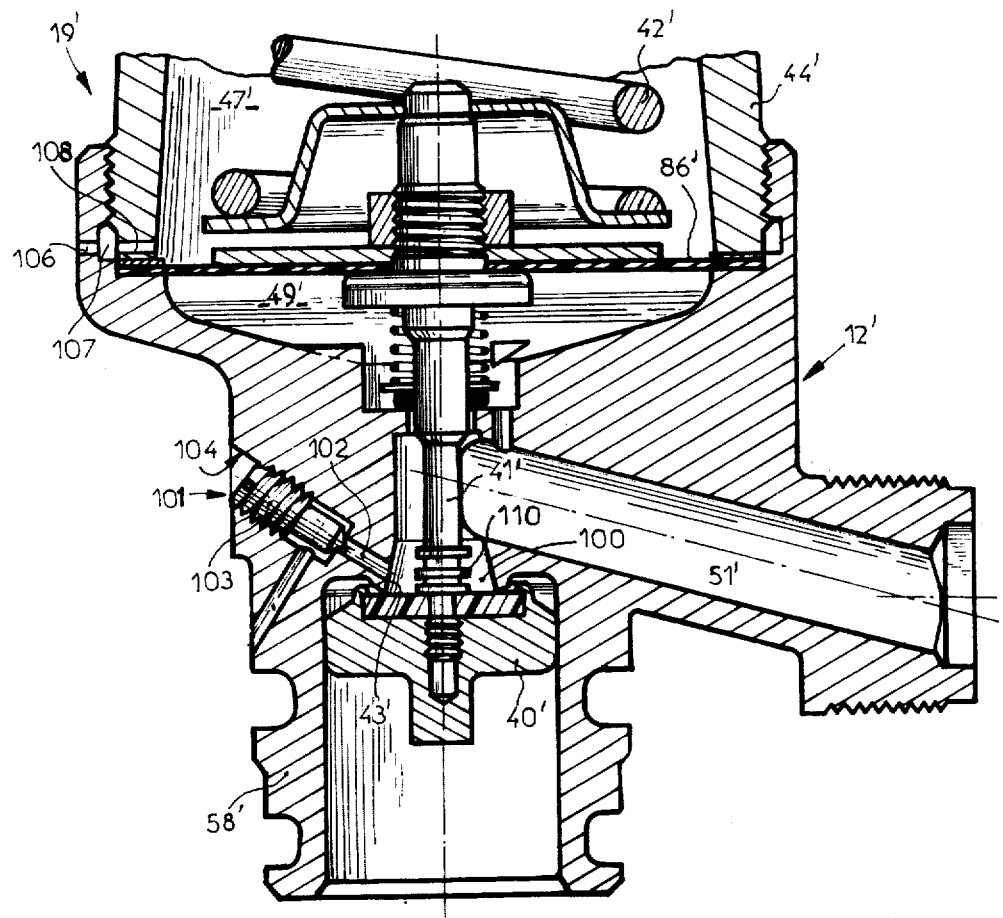
FIG. 5 is a vertical sectional view, with parts broken away, showing a modified form of embodiment of the upper portion of an apparatus according to the invention.

According to the form of embodiment illustrated in FIGS. 1 to 4, an apparatus 10 forming a cock and pressure-reducer unit according to the invention comprises essentially two parts, i.e. a first body 11 into which is sealingly fitted a second body 12, so that the apparatus when assembled forms a single integral unit.

In the body 11 are mounted the stop cock 13, the flow limiting device 14 and the maximum level gauge 15 as well as, as seen in FIG. 3, a gas-pressure measuring apparatus such as manometer 16 and a stand-by supply inlet 17. In the second body 12 is mounted the pressure-reducing device 18 which is controlled by the control device 19 including a manometric control chamber 49. The cock and pressure-reducer unit is mounted on the tank (not shown) at its lower end, for instance by means of a thread 20 formed on the lower sleeve 21 of the body 11. The distribution network (not shown) is connected to an outlet orifice 22 provided in the body 12 for the pressure-reduced gas.

The various components of the cock and pressure-reducer unit can be of any known conventional type and will therefore be described in the following quite concisely.

The stop-cock 13 comprises an operating wheel 23 mounted on a stem 24 provided at its lower end with a closing member 25 which can be moved onto a seat 26 conformed in a corresponding manner in the body 11. A seal ring 27 renders the assembly fluid-tight with respect to the external atmosphere.

The flow-limiting device 14 comprises a valve 28 which slides on a gauge pipe 29 upon which acts a spring 30. It operates in a known manner, which means that in case a gas flow, exceeding a pre-determined value, should pass through the apparatus, the valve 28 will be forced by the gas flow onto a neck 31 of the apparatus, and only a very small leakage flow will pass therethrough. After the normal operating conditions are restored, the said leakage flow enables the pressures to be balanced and the valve 28 to be returned by the spring 30 to its normal position illustrated in FIG. 1.

The maximum level gauge 15 comprises a gauge pipe 29 which penetrates into the tank to the maximum authorized filling level. The pipe 29 communicates through a calibrated orifice 32 with a bore 33 which is normally closed by the closing member 34 of a checking cock, the stem 35 of which is actuated by means of a knurled knob 36. During the filling of the tank, the cock 36 is open and the gas contained in the tank can escape outside through the gauge pipe 29 by passing through the calibrated orifice 32 and by escaping through a hole 37. When the maximum filling level is reached in the tank, some liquefied gas escapes through the pipe 29, thus immediately warning the user owing to the pressure reduction, noticeable in free air, of the liquefied gas escaping through the orifice 37.

The emergency supply port 17 is in the form of a connecting orifice 38 formed in the body 11 and normally closed by a plug 39. In case of need, the plug may be removed and an emergency supply bottle of cylinder -not shown) may be connected to the said port.

The pressure-reducing device 18 comprises a pressure-reducing valve 40 of substantially square configuration and having rounded corners (FIG. 8), the valve 40 being mounted on a stem 41 acted upon by a helical spring 42 tending to open the valve 40 by moving it apart from its seat 43. The spring 42 is mounted in a cap 44 screwed to the body 12. An adjusting screw 45 which bears upon a bearing cup 46 in contact with the spring 42 enables the force of the spring to be adjusted. A fluid-tight membrane 86 is mounted between the cap 44 and the upper portion of the body 12 on which is mounted the cap. Within the cap 44 is formed a chamber 47 communicating with the atmosphere through an orifice 48. Under the membrane 86 is formed a chamber 49 communicating through an orifice 50 with a duct 51 opening into the orifice 22 through which the gas is delivered to the network. This known system enables the device 19 to be so controlled by the pressure-reducing valve 40 as to maintain at the desired value the distribution pressure in the conduit 51 leading to the network. There is also advantageously provided an anti-vibration device 52 comprising a leakage orifice 53 about the stem 41, a ring seal 54, a thrust washer 55 and a spring 56 as described in detail in French Pat. No. 71,20,379 filed on June 4, 1971 in the name of the same Applicant for a "Pneumatic vibration damper for a pressure-reducing device."

As clearly seen when comparing the Figures, the unit 12 is mounted in the unit 11 by simply fitting a lower sleeve 58 of the body 12 into an upper collar 59 which is equivalent in diameter and is formed at the upper portion of the body 11. A ring seal 60 ensures the fluid tightness of the assembly. The body 12 may be mounted at will in any angular position with respect to the body 11 owing to the fact that the sleeve 58 can turn in the collar 59 while at the same time ensuring the fluid tightness of the assembly owing to the seal 60. Thus, in case the upper portion 12 of the apparatus is changed, the outlet orifice 22 can readily be positioned exactly opposite the duct (not shown) of the distribution network.

The body 12 is axially maintained on the body 11 by means of two connecting screws 65, 66, the stems of which are inserted into a groove 67 formed in the lower sleeve 58 of the body 12 and which are also screwed into lugs formed on the upper collar 59 of the body 12. The two lugs 68, 69 into which is inserted the screw 66 are seen in FIG. 2. In FIG. 4 is shown the lug 69 and one of the two lugs 70 into which is screwed the screw 65. Of course, use can be made of any other fastening system using a clamp or the like enabling the units 11 and 12 to be axially secured to one another. Thus and for example, simple screws screwed into openings formed in the collar 59 of the body 11 opposite the groove 67 formed in the sleeve 58 of the body 12 can be used to axially secure the two bodies of the apparatus to one another.

In the various appended drawings and with particular reference to FIG. 1, it is also observed that all ducts such as 51, 71, 72, 73 and the various chambers 74, 75, 76 formed in the cock and pressure-reducer unit are so designed and arranged as to enable any condensate or any liquid entrained into the cock and pressure-reducer unit to freely flow by gravity into the chamber or into the duct located directly upstream, so that the said condensates and liquids automatically return into the tank through the orifice 77 connecting the apparatus to the tank. To this end, the inclined direction of the duct 51 should be noted more particularly, as well as the fact that the valve 40 of the pressure-reducing device and the valve 28 of the flow limiting device are so formed as to enable the liquids to flow automatically, by gravity, into the lower space. In case the return of the condensates located downstream of the pressure-reducing valve 40 should take place unsatisfactorily or incompletely, the closing of the cock 13 enables the valve 40 to be opened completely owing to a reduction of the downstream pressure, thus ensuring a flow towards the seat of the cock 13 which, when re-opened, allows the condensates to flow towards the reservoir.

It should also be noted that the vertical axis 78 of the upper body 12 is shifted with respect to the vertical axis 79 of the body 11 coinciding with that of the gauge pipe 29 and flow-limiting device 14. It is thus possible to considerably reduce the overall height of the apparatus, as well as its weight by reducing the weight of the bodies 11 and 12. The result is a reduction in the manufacturing cost of the apparatus.

Figure 6:
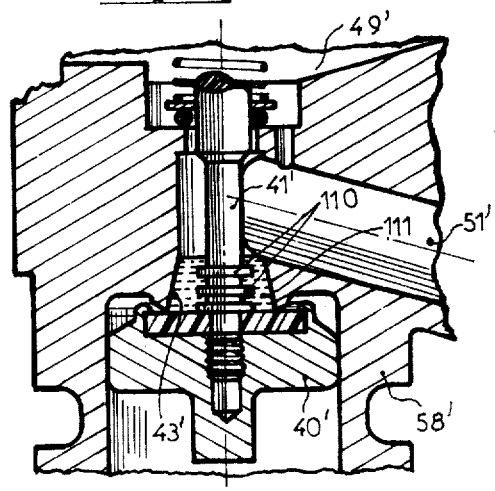
FIGS. 6 and 7 are partial views of FIG. 5 illustrating the operation of the apparatus in specific conditions of use.
Figure 7:
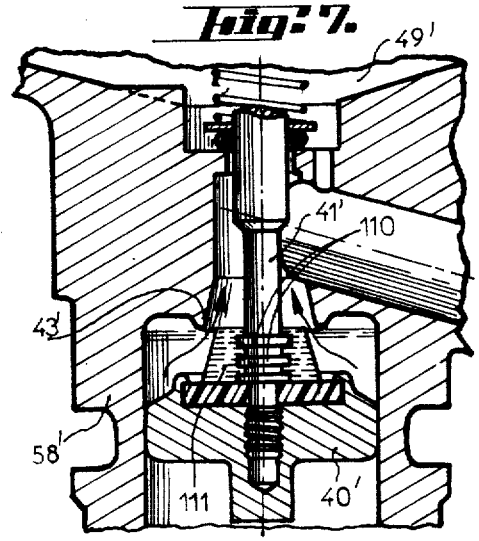

FIGS. 5 to 7 illustrating a modified form of embodiment show a portion of the upper body of a cock and pressure-reducer unit which is somewhat modified as compared with the form of embodiment just described with reference to the preceding Figures. In FIGS. 5 to 7 is shown only a portion of the cock and pressure-reducer unit which includes modifications as compared with the apparatus illustrated in FIGS. 1 to 4, it being understood that the apparatus is the same in all other respects.

In FIGS. 5 to 7, the members similar to those of the form of embodiment illustrated in FIGS. 1 to 4 are indicated by the same numbers accompanied by the sign ('). Therefore, the members will not be described more in detail. The modifications involved in this other form of embodiment will now be described.

At 101 is shown a bleeder passing through the body 12' and opening into a pressure-reducing chamber 100 above the pressure-reducing valve 40'. The bleeder 101 comprises a channel 102 opening in proximity to the seat 43' of the valve 40' the said channel being normally closed by a needle screw 103 which can be screwed into a bore 104 provided in the body 12'. Thus, the liquids which may appear in the chamber 100 can be discharged by carrying out a draining through the bleeder 101 by allowing the gas proceeding from the reservoir to escape, provided the cock 13 (not shown in FIG. 5) is open. Thus, it is even possible to eliminate by such a draining the semi-solid deposits, in particular fats and/or gums, which may form or settle during the use of the apparatus above the pressure-reducing valve 40' and may disturb the operation of the apparatus. Such draining operations may be performed, for instance, during periodical maintenance operations.

Also to be noted in FIG. 5 is the inclination of the duct 51', owing to which the liquids tending to settle in this portion of the apparatus will flow automatically towards the distribution network in which they will be eliminated.

In FIG. 5 is also shown an orifice 106 connected to an annular groove 107 cut at the bottom of the thread by which the cap 44' of the manometric control device 19' is screwed to the body 12'. The groove 107 communicates with the chamber 47' through an orifice 108. Several orifices such as 106 and 108 may be provided around the apparatus. The orifices 106, 108 and the groove 107 fulfil the same function as the orifice 48 (FIG. 1) connecting the chamber 47' with the external atmosphere, so that the membrane 86' is subjected on one side to the atmospheric pressure (chamber 47') and on the other side to the pressure in the manometric control chamber 49'. Owing to such an arrangement of the orifices 106, 108 and of the groove 107 at the bottom of the cap 44', the condensations of atmospheric moisture which may tend to accummulate on the membrane 86' are automatically eliminated and flow outside.

As appears from FIGS. 5 to 7, the pressure-reducing chamber 100 has a particular shape, i.e. the shape of a truncated cone growing narrower starting from the valve seat. Also to be noted are the ridges 110 forming protuberances on the support rod 41' of the valve 40'.

Thus, should solid deposits such as gums or, for instance, an ice plug, tend to form in chamber 100 above the valve 40', as shown at 111 in FIGS. 6 and 7, such a solid deposit is not liable to stop the operation of the apparatus.

Indeed, as seen in FIG. 7, owing to the conical shape of the deposit 111 corresponding to the conical shape of the chamber 100, and owing to the protuberances 110 of the rod 41', the solid deposit 111 moving together with the stem 41' permits, as a result of a simple lowering of the said stem under the action of the control device 19', the passage of the gases as illustrated by the arrows in FIG. 7 between the external wall of the deposit 111 and the internal wall of the chamber 100. This would not happen if the chamber 100 were cylindrical as illustrated for example in FIG. 1, in which a solid deposit formed about the stem 41 above the valve 40 is capable of closing the passage for the gases.

Of course, the invention is by no means limited to the forms of embodiment described and illustrated which have been given by way of example only. In particular, it comprises all the means constituting technical equivalents to the means described as well as their combinations, should the latter be carried out according to the spirit of the invention.

What is claimed is:

1. Cock and pressure-reducer unit for connecting a source of liquefied gas under pressure to a gas distribution network after reducing the pressure of the gas, said cock and pressure-reducer unit comprising first and second bodies, a flow-limiting device, a stop cock having a closed position preventing flow and an open position permitting flow, a pressure-reducing device having a pressure-reducing chamber, a seat in the latter chamber and valve means acting with said seat, said valve means being controlled by a manometric control chamber acted upon by the pressure of the gas at the inlet into the distribution network, and a maximum level gauge, wherein the aforesaid components are so arranged with respect to one another that gas proceeding from the source and supplied to a network passes successively through the flow-limiting device, the stop cock and the pressure-reducing device, said flow-limiting device and said stop cock being mounted on said first body, and the pressure-reducing device and its control chamber being mounted on said second body, said second body being fitted sealingly into said first body and being removably connected thereto, whereby said stop cock may be placed in its closed position to permit said second body to be removed, as required, without flow of gas beyond said stop cock.

2. Cock and pressure-reducer unit according to claim 1, wherein a connecting orifice is provided in a wall of said pressure-reducing chamber opening into the latter chamber of the cock and pressure-reducer unit downstream of the stop cock and upstream of the pressure-reducing device, and a plug removably closing said connecting orifice, whereby in an emergency the latter plug may be removed and an emergency supply may be connected to said connecting orifice.

3. Cock and pressure-reducer unit according to claim 2, wherein said connecting orifice is provided in said first body.

4. Cock and pressure-reducer unit according to claim 1, wherein said second body ends at its base with a lower sleeve, said first body ends at its upper edge with an upper collar, said lower sleeve of said second body is fitted into said upper collar, the latter having a diameter which is equivalent to that of said sleeve, said sleeve being adapted to freely turn in said collar sealing means being provided between said sleeve and said collar, and axial retaining means ensuring the axial maintenance, each against the other, of said bodies.

5. Cock and pressure-reducer unit according to claim 1, wherein said first body and said second body have substantially vertical axes and are formed with ducts and chambers through which the gas passes and which are so arranged as to enable any condensate or liquid entrained into the cock and pressure-reducer unit to flow freely by gravity into a chamber or duct located upstream.

6. Cock and pressure-reducer unit according to claim 1, wherein said first and second bodies respectively have substantially central axes, and the axis of said first body being shifted with respect to that of the second body.

7. Cock and pressure-reducer unit according to claim 1, comprising a draining orifice closed by needle screw means substantially at the level of the seat of the pressure-reducing device and downstream with respect to said seat.

8. Cock and pressure-reducer unit according to claim 1, wherein above the seat of the pressure-reducing device, the chamber of the cock and pressure-reducing unit has a section which diminishes progressively, and a control rod connecting said valve means to said control manometric chamber above said seat, said rod being provided with protuberances in said section.

9. Cock and pressure-reducer unit according to claim 1, wherein an outlet duct of the cock and pressure-reducer unit leading to a distribution network is downwardly inclined from the cock and pressure-reducer unit to the distribution network.

10. Cock and pressure-reducer unit according to claim 1, wherein an atmospheric chamber of a control device of the pressure-reducing device communicates with the atmosphere through at least one orifice provided substantially at the height of a membrane of said control device and opening into a groove provided all around the said chamber said groove communicating with said atmospheric chamber through at least one orifice.

11. Cock and pressure-reducer unit according to claim 1, wherein above the seat of the pressure-reducing device a chamber of the cock and pressure-reducer unit has a section which diminishes progressively in an upward direction so that upon displacement of said valve means downwardly away from said seat any matter which tends to accumulate in said section will move downwardly out of said section to prevent blocking.

* * * * *